United States Patent Office 3,035,738
Patented May 22, 1962

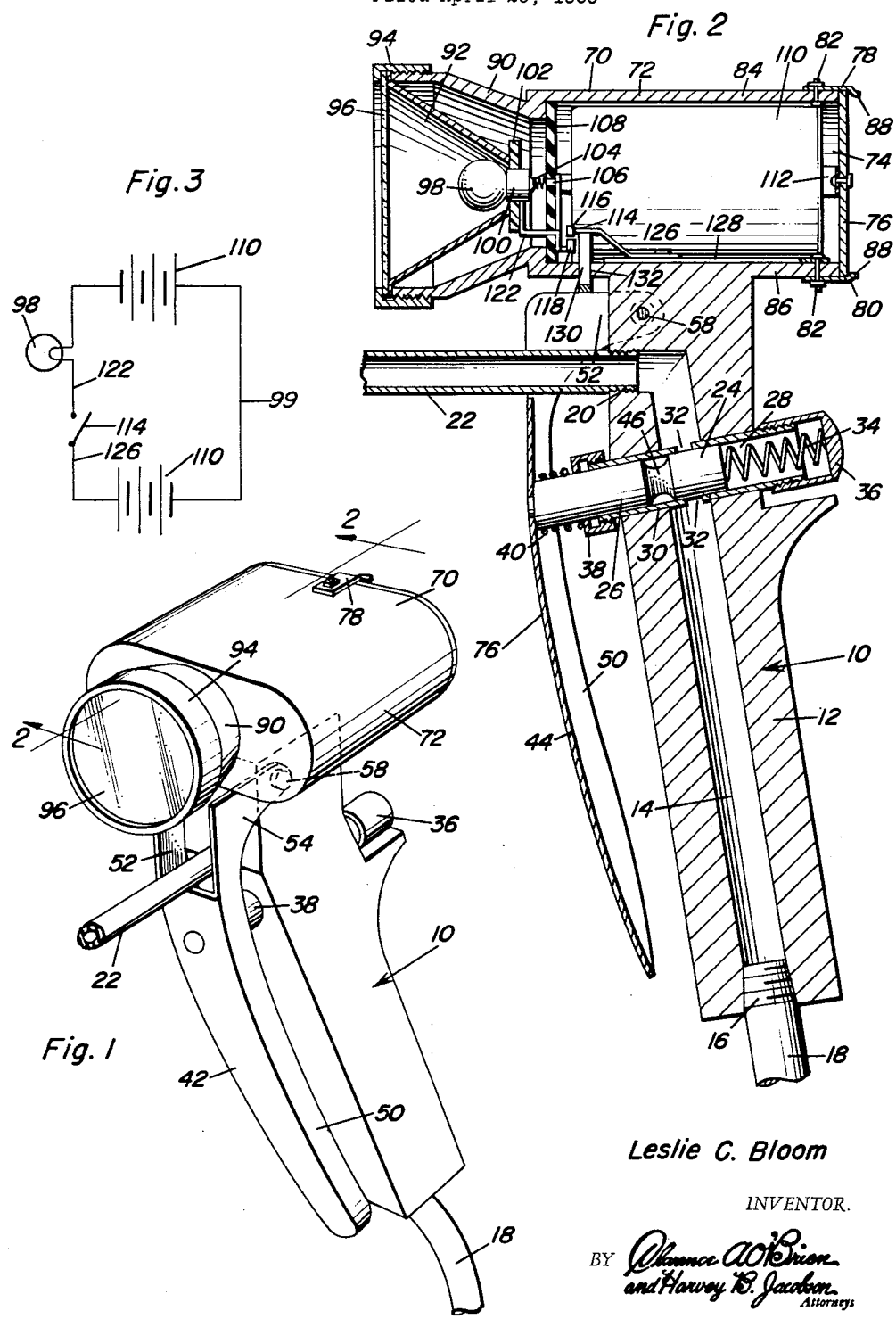

3,035,738
ILLUMINATING GREASE GUN
Leslie C. Bloom, Libby, Mont., assignor to
Lubrilite Corporation, Libby, Mont.
Filed Apr. 29, 1959, Ser. No. 809,787
7 Claims. (Cl. 222—113)

This invention relates to grease guns and more particularly to improvements in grease guns enabling the use thereof to be materially facilitated.

An object of the invention is to provide a grease gun with an illuminating device so that the general area of intended use for the grease gun is illuminated thereby facilitating the lubrication of parts by use of the grease gun.

Another object of the invention is to provide a grease gun with a low voltage, preferably D.C., source of illumination, a typical example being an ordinary or modified flashlight structure capable of casting either floodlight illumination or a spot focus illumination beneath the undercarriage of the motor vehicle or any other area of the motor vehicle where it is necessary or desired to use the grease gun.

An important feature of the invention entails a typical embodiment thereof wherein the switch of the illuminating device is integrally united in a functional sense with the conventional valve operator of the grease gun. One preferred arrangement is to have the switch function slightly in advance of the opening of the grease gun valve so that for the initial movement of the valve operator light is available and upon very slight further movement of the valve operator, the valve is opened enabling grease under pressure to pass through the passageway in the grease gun for ultimate pressure application into a grease fitting. With the valve operator being in constant engagement with both the switch and the valve, all three elements may be subject to the same spring bias applied to the valve directly so as to maintain the sequential operational phase relationship and smooth functioning without frequent adjustment.

Those persons who have had any experience in lubricating a motor vehicle, for instance an ordinary automobile, can readily appreciate some of the difficulties that are tolerated by unsatisfactory methods. The operator generally stands beneath the motor vehicle while it is maintained in an elevated position such as resting on a lift. The lighting is ordinarily from overhead or from the sides meaning that the user of the grease gun operates in semi-darkness. This is especially true at night time where artificial light alone is relied on. Sometimes the attendant using the grease gun goes through the bother of obtaining a drop cord and hanging it on a part of the undercarriage or running gear of the motor vehicle. Even this is a poor solution to the problem because the direction of the light does not retain itself since the drop cord lamp cage turns on the hook or the hook slips a little changing the direction of the light. The light when shining directly in the eyes of the operator, is an annoyance.

The invention provides a highly satisfactory solution to the problem and to the difficulties that are now tolerated by attendants using conventional grease guns. The light source is maintained as a portion of the grease gun and is directed by simply turning the grease gun in the target direction i.e. the direction where the attendant expects to find a grease fitting. Absolutely no additional effort on the part of the operator is required such as is required in using a drop cord or a separate flashlight held in the left hand while the right hand holds the grease gun. Furthermore, with most grease guns two hands are required to operate the grease gun satisfactorily. One hand is necessary to firmly place the nozzle of the grease gun on the grease fitting and the other hand to hold the grease gun handle. Ordinarily the grease gun nozzle is connected to the body of the nozzle by a flexible hose making the two-hand operation essential.

These together with other objects and advantages which will become subsequently apparent reside in the details of construction and operation as more fully hereinafter described and claimed, reference being had to the accompanying drawings forming a part hereof, wherein like numerals refer to life parts throughout, and in which:

FIGURE 1 is a perspective view of a grease gun in accordance with the invention.

FIGURE 2 is a sectional view taken on the line 2—2 of FIGURE 1.

FIGURE 3 is a schematic wiring diagram of the lighting device of the grease gun.

In the accompanying drawings there is a grease gun 10 which diagrammatically represents any type of conventional grease gun and any manufacturer's make. All grease guns have a body 12 provided with a longitudinal passageway 14 to one end of which a coupling or hose connection 16 is secured. The hose connection is at the end of a flexible hose 18 that is operatively associated with a source of grease maintained under air pressure or applied under air pressure. The grease passes through passageway 14 and is discharged through an outlet port 20 at one end of the passageway. The grease is usually conducted by means of a flexible hose 22 that is attached to or in port 20 and is fed to a nozzle that is especially constructed for engaging a grease fitting.

Valve 24 is operatively connected with the body 12 and is arranged to control the passing of grease through passageway 14. Typical valve 24 is composed of a cylindrical valve core 26 axially slidable in bore 28 that is extends transversely across body 12 including passageway 14. The bore has a single or multiple liner 30 accommodating the valve core 26. Where a multiple liner is used the sections thereof are spaced to form a port 32, and where a single liner is used, it is ported very much the same as port 32 (FIGURE 2).

Spring 34 is disposed in one end of bore 28 and seats upon the inner end of valve core 26. The opposite end of the spring engages a wall of cap 36 which is threaded onto the rear end of liner 30 on the exterior of body 12. The opposite end of the liner has a collar 38 threaded thereon which constitutes a seat against which spring 40 bears. The spring is concentrically mounted on valve core 26 and bears against the front wall 42 of handle 44. The handle constitutes a valve operator for valve 24. The final part of valve 24 consists of a circumferential groove 46 formed in the core between its ends. When in the rest position valve 24 is as shown in FIGURE 2. Groove 46 is laterally separated from port 32, and spring 34 projects the valve core to the position shown in FIGURE 2 and yieldingly opposes movement of the valve core in a direction to line the groove 46 with port 32.

Valve operator 44 has, in addition to wall 44 strengthening ribs 50 along the side longitudinal edges thereof and between which spring 40 is disposed. The valve core may be attached to the handle wall 42 by a loose rivet or an equivalent connector. The upper end of the valve operator has sides 52 and 54 which consist of widened portions of ribs 50 and fitting on opposite sides of the upper part of body 12. Spindle 58 is extended through aligned openings in sides 52 and 54 and in the part of body 12 located therebetween. This mounts the valve operator for swinging movement against the yielding opposition of the springs 40 and 34.

An illuminating device 70 is connected with body 12. The illuminating device consists of a casing 72 having an open rear end 74 maintained in a normally closed condition by means of removable cover 76. The cover is held in place by leaf spring latches 78 and 80 which are attached by fasteners 82 to the upper and lower walls 84 and 86 of case 72. There are curved latch members 88 at the ends of the leaf spring latches to grip against a part of the edge of closure 76 and hold it separably in place.

The front part of the case 72 has a housing 90 within which a conventional light reflector 92 is held by means of ring 94. A lens 96 is also held in place by ring 94, being clamped between the outer edge of reflector 92 and a part of the ring. Light bulb 98 is threaded in socket 100, the latter carried by an insulating member 102 mechanically supported within the housing 90. The center contact of the light bulb is engaged by spring 104, and this contacts a conductive member 106 carried by the insulating partition wall 108 mounted between the housing 90 and the remainder of case 72 and at the juncture thereof. The case is so dimensioned as to receive a pair of flashlight batteries 110 whose rear ends are contacted by conductive strip 112 that is secured to the closure 76. It is to be clearly understood that this number of flashlight batteries may be increased or reduced and further, other types of batteries may be selected.

The circuit of the illuminating device is conventional as depicted in FIGURE 3. Light bulb 98 is conductively connected with the batteries 110 and these are connected in series with switch 114. The switch 114 is of special construction and is a normally closed switch. It is made of an upper contact 116 and a lower contact 118. Lower contact 118 is connected to a conductor 122 which extends through an opening in wall 108 and which is connected to socket 100. The upper contact 116 is in electrically conductive union with the center contact of the light bulb by way of conductive spring metal strip 126, conductor 128 and the spring metal clip or contact 112.

A switch operating plunger rod 130 has its upper end in engagement with conductive metal strip 126 and its lower end in engagement with a part of the valve operator 42. The mechanical connection may be established by simply resting the lower end of the rod 130, this being of insulating material, on the top of the valve operator or may be established by some other conventional mechanical expedient such as a pivot or hinge.

In operation, the valve operator is moved in a direction to open valve 24. In one arrangement the circuit 99 (FIGURE 3) is first closed so that light is available before grease begins to issue through port 20 and hose 22. This is made possible by virtue of the nature of switch 114. It is a normally closed switch held open by rod 130 when the valve operator is relaxed. But as soon as the valve operator is moved in a direction to open valve 24 rod 130 is lowered through the aperture 132 in wall 86 which guides the rod, constraining its movement, and enabling the resilience of the conductive spring metal member 126 to close contacts 116 and 118. This energizes the lamp 98 that is controlled by switch 114.

It is now quite evident that further movement of the valve operator in the same direction aligns groove 46 at least in part with port 32 and then in proper registry with port 32 for communicating port 32 with grease under pressure issuing through passageway 14.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination, a grease gun having a body, external pressure supply means, a grease passageway formed in said body for conducting grease under pressure from the external supply means, a manually operable valve controlling said passageway, a valve operator carried by said body to actuate said valve, an electric lighting device fixedly carried by said body and having a switch biased closed to control the energization thereof, and mechanical means constantly engaged with said switch and said valve operator for initially, controllably releasing said switch for biased closing thereof and subsequently opening said valve for admitting grease through said passageway, said mechanical means including a rod engaged by said valve operator, said casing having an aperture through which said rod extends for constraining the movement of said rod, one of said contacts being fixed, the other of said contacts being movable, a spring metal conductor supporting said other of said contacts, said contacts coacting to form a normally closed switch, and said rod engaging said spring metal conductor and holding it in a position to maintain said contacts spaced from each other when said operator is in the rest position at which said valve is closed.

2. A grease gun having a grease inlet and a grease outlet for exercising control over the flow of grease from a source of grease under pressure, said grease gun comprising a pistol grip handle provided with a grease passageway with which said grease inlet and said grease outlet are communicated, a grease control valve interposed in said passageway, a valve operator, means movably connecting said valve operator with said handle in hand gripping relation thereto, said valve constantly contacting said valve operator for actuation of said valve in response to movement of said valve operator, a lighting device including a casing fixedly carried by said handle, electric circuit means connected with said casing and including a switch, switch actuating means constantly engaged with said switch and said valve operator and operable to sequentially actuate said switch to a circuit closing position in advance of the opening of said valve in response to actuation of said valve operator, said valve operator being a lever, and said connecting means comprising a spindle connected with said handle and having a portion of said lever mounted thereon, said grease outlet extending through said portion of the lever and limiting movement thereof in one direction.

3. An illuminating grease gun comprising an elongated grip handle, illumination casing means fixedly connected to one end of the handle and extending transversely thereto, longitudinal passage means disposed within said handle having a lower end connected to an external pressure lubricant supply source and an upper end terminating in spaced relation below the casing means, an outlet conduit connected to the upper end of the passage means extending forwardly from the handle parallel to the casing means, grip lever means pivotally connected to the handle between the casing means and the upper end of the passage means and extending downwardly therefrom in front of the handle in hand gripping relation thereto, valve means mounted in said handle perpendicular to said passage means for controlling flow of lubricant therethrough including a portion projecting forwardly from the handle for engagement within the grip lever means, illuminating means mounted within the casing means, illuminating control means operatively connected to the illuminating means and movably projecting from the casing means into constant engagement with the lever means for energizing the illuminating means in advance of opening of the valve means upon rearward displacement of the lever means toward the handle.

4. The combination of claim 3, wherein the valve means comprises, a removable transverse valve body extending through the handle and intersecting the passage means, a valve element slidably mounted in said body including said forwardly projecting portion and adjustable bias spring means mounted within the valve body biasing the valve element forwardly imposing an opening bias thereon and operative through the lever means to bias the control means to an inoperative position.

5. The combination of claim 4, wherein said lever means includes an upper pivot portion for pivotal connection to the handle through which the outlet conduit extends to thereby limit pivotal movement of the lever means under the biasing influence of the spring means.

6. The combination of claim 3, wherein said lever means includes an upper pivot portion for pivotal connection to the handle through which the outlet conduit extends to thereby limit pivotal movement of the lever means under the biasing influence of the spring means.

7. The combination of claim 3, wherein said control means includes switch means biased to a closed position and engageable with the lever means for holding the switch means in an open position.

References Cited in the file of this patent

UNITED STATES PATENTS

| | | |
|---|---|---|
| 1,225,865 | Schneible | May 15, 1917 |
| 1,285,553 | Bateman | Nov. 19, 1918 |
| 2,240,195 | Reiber | Apr. 29, 1941 |
| 2,252,267 | Lofgren | Aug. 12, 1941 |
| 2,330,592 | Kendrick | Sept. 28, 1943 |
| 2,894,117 | Koskey | July 7, 1959 |